US006571824B2

(12) United States Patent
Jones et al.

(10) Patent No.: US 6,571,824 B2

(45) Date of Patent: Jun. 3, 2003

(54) DUAL MATERIAL CHEMICAL INJECTOR FOR VEHICLE WASH SYSTEM

(75) Inventors: Allen S. Jones, Bay of Islands (NZ); Kimmo Ukkola, Green Bay, WI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 73 days.

(21) Appl. No.: 09/848,917

(22) Filed: May 4, 2001

(65) Prior Publication Data

US 2002/0003174 A1 Jan. 10, 2002

Related U.S. Application Data

(60) Provisional application No. 60/203,233, filed on May 8, 2000.

(51) Int. Cl.[7] .................................................. G05D 11/03

(52) U.S. Cl. ........................ 137/597; 137/889; 137/892

(58) Field of Search ................................ 137/888, 889, 137/891, 892, 893, 894, 895, 597 I; 239/400, 407, 416.1

(56) References Cited

U.S. PATENT DOCUMENTS 4,315,600 A * 2/1982 Rhoades et al. ............ 137/893
4,474,680 A 10/1984 Kroll .......................... 252/307
4,535,821 A 8/1985 Anderson ................... 137/884
5,023,021 A 6/1991 Conrad ........................ 261/76
5,109,822 A * 5/1992 Martin ....................... 137/883
5,298,198 A 3/1994 LaCrosse ..................... 261/76
5,439,020 A 8/1995 Lockhart ....................... 137/3
5,518,022 A * 5/1996 Ziehm ........................ 137/895
5,655,713 A 8/1997 Gibney et al. .............. 239/310
5,758,799 A * 6/1998 Patterson .................... 137/891

FOREIGN PATENT DOCUMENTS

EP 0 893 644 1/1999

* cited by examiner

*Primary Examiner*—Stephen M. Hepperle
(74) *Attorney, Agent, or Firm*—Andrus, Sceales, Starke & Sawall, LLP

(57) ABSTRACT

A chemical injection system for use in a vehicle wash system having a single spray arch that distributes a plurality of various chemicals onto a vehicle during the wash process. The chemical injection system includes a high pressure supply manifold formed from stainless steel that receives a high pressure supply of inlet water. The supply manifold receives a plurality of individual chemical injectors that are each connected to a supply of one or more chemicals. Each of the chemical injectors is formed from a thermoplastic material and is separately insertable into the high pressure supply manifold. The flow of water through the chemical injectors creates a Venturi effect that pulls the chemical agent into the water supply for distribution downstream through the spray arch.

14 Claims, 4 Drawing Sheets

DUAL MATERIAL CHEMICAL INJECTOR FOR VEHICLE WASH SYSTEM

CROSS-REFERENCE TO RELATED APPLICATION

The present invention is based on and claims priority to U.S. Provisional Application Ser. No. 60/203,233 filed on May 8, 2000.

BACKGROUND OF THE INVENTION

The present invention generally relates to a combination high pressure injection nozzle and concentrated chemical injector for use in a vehicle wash system. More specifically, the present invention relates to a high pressure injection nozzle that is formed from stainless steel or a hard alloy material and a separate concentrated chemical injector formed from a non-corrosive, inert plastic material.

In present mixing devices for mixing a chemical detergent into a high pressure stream of water in a vehicle wash system, a high pressure control orifice is integrated with a chemical injector into a single unit. Since the control orifice and the chemical injector are a single piece, the materials used to form the high pressure control orifice are the same as the materials used for the chemical injector.

Typically, the high pressure control orifice is best suited for a stainless steel or hard alloy material due to the ability of the metal to withstand high pressures. However, the chemical injection system inserts a concentrated chemical solution into the water supply that is highly corrosive to the stainless steel or hard alloy material required for the high pressure control. Thus, after periods of continuous use, the stainless steel integrated high pressure control orifice and chemical injector needs to be replaced as a single unit when the corrosive effects of the chemical concentrate damaged the unit. The currently available design requires a long and expensive process for changing a chemical injector, since the entire unit has to be replaced even if only one of the chemical injectors had been damaged.

Therefore, it is an object of the present invention to provide a multi-component chemical injecting system in which the high pressure injection nozzles and the concentrated chemical injecting system are designed and manufactured out of dissimilar materials. Further, it is an object of the present invention to provide a high pressure orifice formed from stainless steel or hard alloy material to withstand the high pressures from the fluid inlet. Further, it is an object of the present invention to provide a chemical injector that is formed from a non-corrosive, inert plastic material that can withstand the corrosive effects of the concentrated chemicals. Further, it is an object of the present invention to provide a unit in which the chemical injectors can be press fit into the high pressure manifold and sealed with O-rings, thus not requiring the typical threaded connections of the prior art designs.

SUMMARY OF THE INVENTION

The present invention relates to a multi-component, chemical injection system used for a vehicle wash system. The present invention includes a supply manifold formed from stainless steel or other type of hard alloy material. The high pressure water supply manifold receives a supply of high pressure water from an inlet fitting and directs the high pressure water through the supply manifold. A plurality of flow control orifices are included in the supply manifold to provide individual outlets from the supply manifold.

Each of the flow control orifices receives an injector nozzle that reduces the water pressure existing within the supply manifold as it leaves the supply manifold. The injector nozzles are press fit within the flow control orifice and sealed by an O-ring positioned between the supply manifold and the injector nozzle.

Each injector nozzle, in turn, receives a chemical injector having an injector body and a chemical inlet. The chemical inlet receives a supply of concentrated chemical detergent used during the operation of the vehicle wash system. The injectors are formed from a non-corrosive, inert plastic material that can resist the corrosive nature of the concentrated chemical inputs. As the flow of fluid passes through the injector body, a Venturi effect is created to draw the concentrated chemical from the chemical inlet. Thus, the concentrated chemical flows out of the injector and never enters into the stainless steel high pressure injector nozzle. Likewise, the chemical injector does not ever see the high pressure water in the supply manifold and injection nozzles. The two-piece construction of the high pressure injector nozzles and chemical injectors allows each of the components to perform a distinct function without suffering from the drawbacks of prior art systems.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
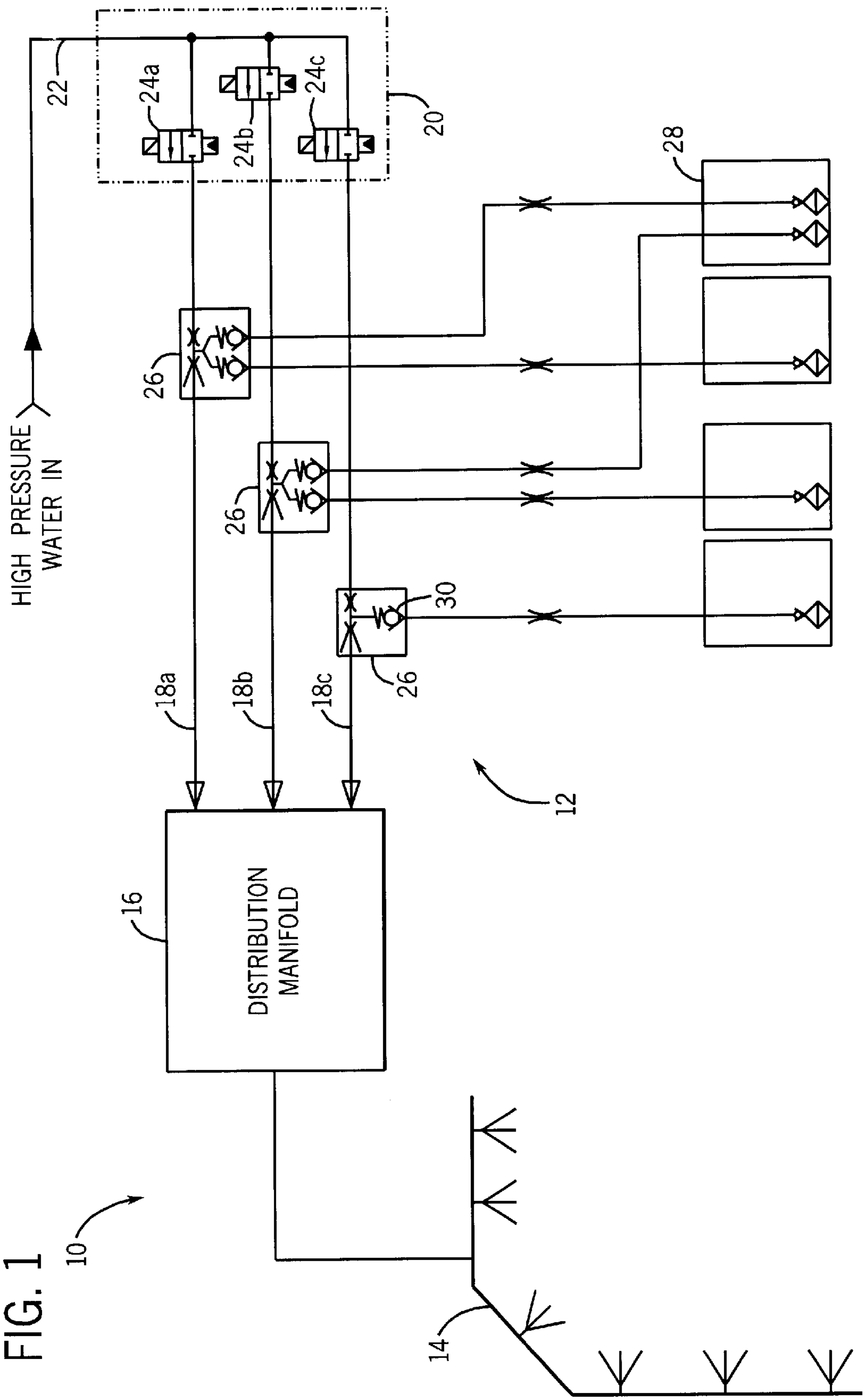
FIG. 1 is a valving and piping diagram illustrating the components of a vehicle wash system including a chemical injection system of the present invention.

Referring now to FIG. 1, thereshown is a vehicle wash system 10 incorporating a chemical injection system 12 of the present invention. The vehicle wash system 10 is preferably an in-bay vehicle wash system that incorporates a single spray arch 14 that travels around the perimeter of a stationary vehicle while applying various types of soap, chemicals and rinse water to effectively clean the vehicle contained within the wash bay. Since the vehicle wash system 10 includes only a single spray arch 14, various types of chemicals and rinse water must be distributed through a common piping system in a specified sequential order in order adequately clean the vehicle. The single spray arch 14 thus requires the use of a distribution manifold 16 to select between a plurality of inlet lines 18*a*–18*c*.

As illustrated in FIG. 1, each of the inlet lines 18*a*–18*c* is received from a supply manifold 20 that in turn receives a supply of high pressure water at an inlet 22. The supply manifold 20 includes a plurality of individual valve controllers 24*a*–24*c*. Each of the valve controllers 24*a*–24*c* is operated by a control unit (not shown) such that the valve controllers 24*a*–24*c* selectively allow the high pressure water from the supply manifold 22 to flow along the respective inlet line 18*a*–18*c*.

As shown in FIG. 1, each of the inlet lines 18*a*–18*c* includes a chemical injector 26. Each of the chemical injectors 26 is coupled to a supply container 28 for one or more chemical agents used during the cleaning process. For example, the chemical agents could be a wheel cleaner, rust inhibitor, clear coat polish, drying agent, clear coat conditioner, foaming detergent or a spot-free rinse agent. As will be discussed in greater detail below, each of the chemical injectors 26 includes a one-way valve 30 that allows the chemical agent to flow in only one direction and be introduced into the respective inlet line 18*a*–18*c* through the Venturi effect created by the flow of water through the chemical injector.

As can be understood in FIG. 1, the supply of the chemical agents to the spray arch 14 is controlled by the operation of the valve controllers 24*a*–24*c* and the use of the distribution manifold 16. Each of the chemical injectors 26 allows the proper chemical agent 28 to be inserted into the flow of water prior to the flow of water reaching the spray arch 14.

Figure 2:
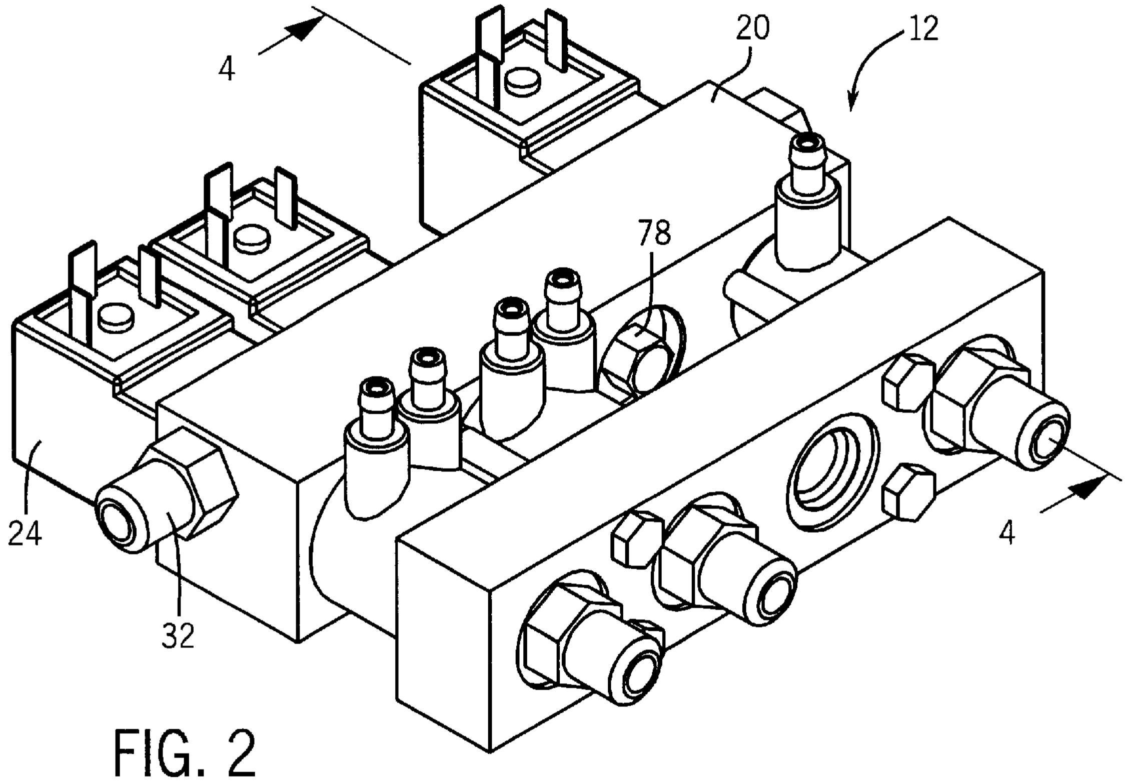
FIG. 2 is a perspective view illustrating the multi-component construction of the chemical injection system of the present invention.

Referring now to FIG. 2, thereshown is a detailed view of the chemical injection system 12 of the present invention. The chemical injection system 12 receives the supply of high pressure water through an inlet fitting 32 formed on the supply manifold 20. As can be seen in the section view of FIG. 4, the supply manifold 20 includes an internal passageway 34 that extends along the entire length of the supply manifold 20 and directs the flow of high pressure water from the inlet fitting 32 along the length of the supply manifold 20.

Figure 4:
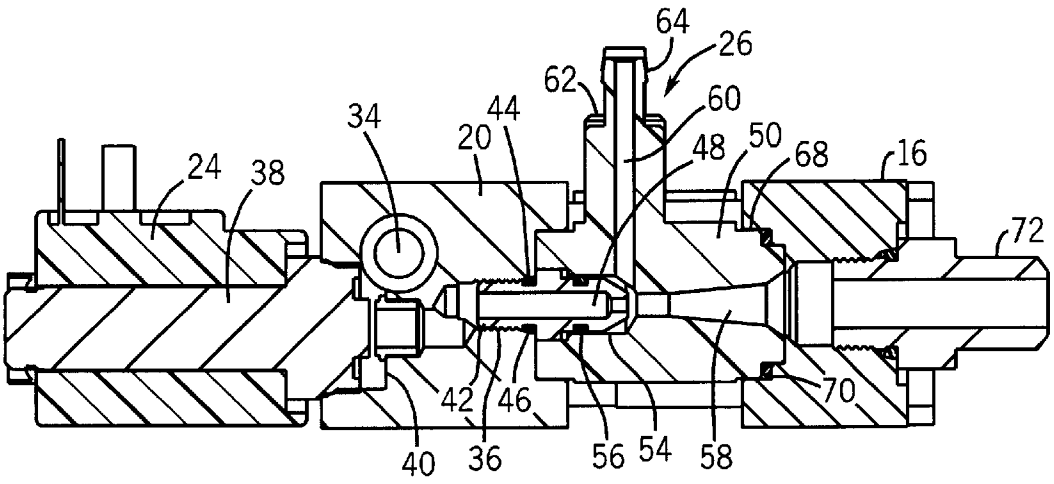
FIG. 4 is a section view taken along line 4—4 of FIG. 2 illustrating the interconnections between the various components of the chemical injection system of the present invention.
Figure 3:
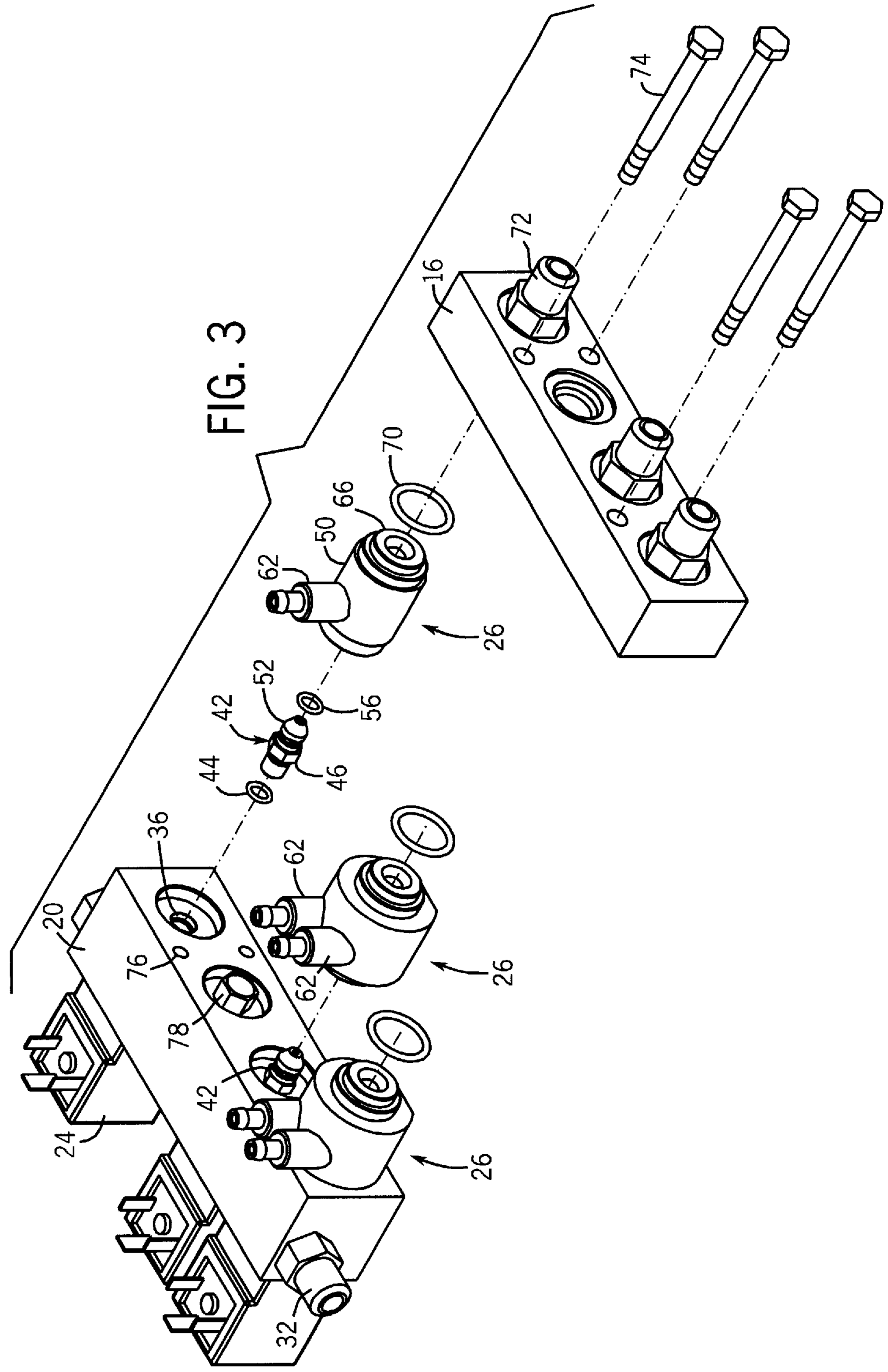
FIG. 3 is an exploded perspective view illustrating the individual components that form the chemical injection system of the present invention.
Figure 5:
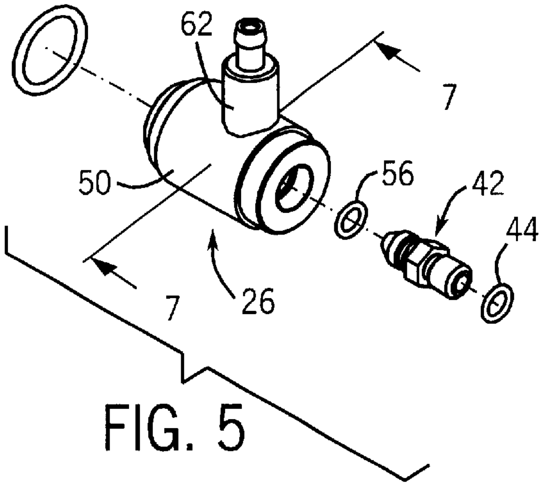
FIG. 5 is an exploded perspective view illustrating the details of an individual single chemical injector.

Referring now to FIG. 3, the supply manifold 20 includes a plurality of flow control orifices 36 that each provide an outlet passage for the high pressure water from within the supply manifold 20. Referring back to FIG. 4, the fluid flow path between the internal passageway 34 formed in the supply manifold and each of the flow control orifices 36 is controlled by a movable plunger 38 operated by the valve controller 24. As illustrated in FIG. 4, the plunger 38 is movable toward and away from an internal seat 40 to prevent flow of the high pressure water between the internal passageways 34 and the flow control orifice 36. As discussed previously, the valve controller 24 selectively allows the high pressure water from the supply manifold 20 to exit the flow control orifice 36 when signaled to do so by the control unit for the vehicle wash system.

In the preferred embodiment of the invention illustrated in FIGS. 2 and 3, the supply manifold 20 is formed from stainless steel, or some other type of hard alloy material. The internal passageway 34 contained within the supply manifold is preferably milled from the block of material used to create the supply manifold 20. The supply manifold 20 is preferably formed from stainless steel or some other type of hard alloy material in order to allow the supply manifold 20 to withstand the high pressure water entering through the inlet fitting 32. In the preferred embodiment of the invention, the water entering into the supply manifold 20 through the inlet fitting 32 is between 300 psi and 1500 psi.

Referring now to FIGS. 3 and 4, each of the flow control orifices 36 receives a high pressure injector nozzle 42 and an O-ring 44. The O-ring 44 is trapped between a shoulder 46 formed on the injector nozzle 42 and an inner seat formed on the flow control orifice. In the embodiment of the invention illustrated in FIG. 4, the injector nozzle 42 is held within the flow control orifice 36 by the threaded interconnection between the injector nozzle 42 and the internally threaded flow control orifice. As can be seen in FIG. 4, the injector nozzle 42 includes a fluid passageway 48 that allows the high pressure water to flow through the injector nozzle 42 from the supply manifold 20. In the preferred embodiment of the invention, the injector nozzle 42 is formed from a metallic material, such as brass, in order to withstand the high pressure water.

As can be seen in FIGS. 3 and 4, the outer end of the injector nozzle 42 is received within a cylindrical body 50 of the chemical injector 26. Specifically, the outer end 52 of the injector nozzle 42 is received within an attachment opening 54 formed in the body 50 of the chemical injector 46. An O-ring 56 surrounds the outer end 52 of the injector nozzle 42 and creates a fluid-type seal within the injector body 50.

As illustrated in FIG. 4, the body of the chemical injector 26 includes a main passageway 58 that receives the flow of water from the fluid passageway 48 formed within the high pressure injector nozzle 42. The main passageway 58 is also in fluid communication with a chemical inlet passageway 60 formed within the chemical inlet 62. The chemical inlet 62 includes an upper flange 64 that provides a fluid tight communication with the supply of chemical entering into the chemical inlet 62.

Figure 7:
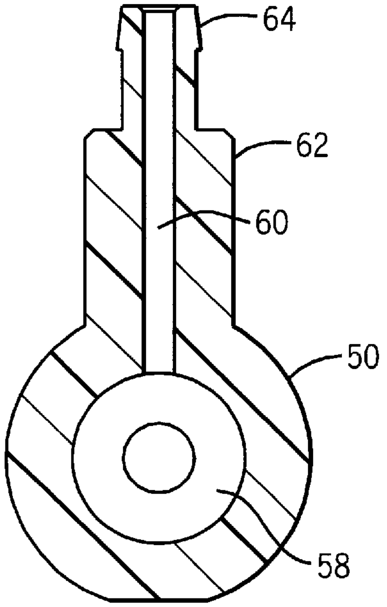
FIG. 7 is a section view taken along line 7—7 of FIG. 5 illustrating the flow passageway between the chemical inlet of the single chemical injector and the outlet flow path.

Referring now to FIG. 7, the interconnection between the chemical inlet passageway 60 and the main passageway 58 formed within the body 50 is thereshown. As can be understood in the drawings, the injector nozzle 42 reduces the pressure of the inlet water from the supply manifold prior to the inlet water entering into the injector body 50. Thus, the injector body 50 does not see the high pressure water that enters into the inlet fitting of the supply manifold. As the supply of water flows through the main passageway 58, the Venturi effect draws the chemical agent down through the chemical inlet passage 60 where it is mixed with the supply of water.

Figure 6:
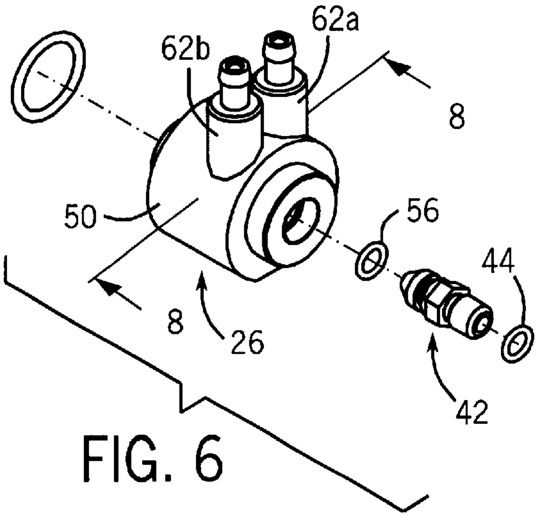
FIG. 6 is an exploded perspective view illustrating the details of an individual dual chemical injector.
Figure 8:
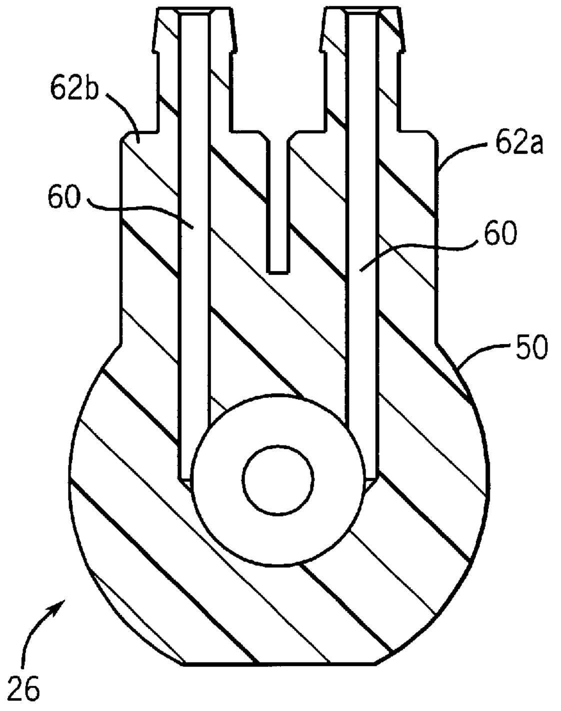
FIG. 8 is a section view taken along line 8—8 of FIG. 6 illustrating the pair of flow paths between the chemical inlets and the outlet flow path of the dual chemical injector.

In the embodiment of the invention illustrated in FIGS. 2 and 3, the chemical injector 26 is shown as including both a single chemical inlet 62 and a pair of chemical inlets 62*a* and 62*b*, as illustrated in FIGS. 6 and 8. Specifically, in FIG. 8 the pair of chemical inlets 62*a* and 62*b* attached to the single body 50 provide a pair of chemical inlet passageways 60. In this manner, the chemical injector 26 having the pair of chemical inlets 62*a* and 62*b*, as illustrated in FIGS. 6 and 8, allows two types of chemicals to be simultaneously introduced into the flow of water passing through the body 50 of the chemical injector 26.

In the embodiment of the invention illustrated in the Figures, the entire chemical injector 26 is integrally formed from a thermoplastic material. Preferably, the chemical injector 26 is molded from plastic in the shape shown in the Figures. The use of a thermoplastic material to form the injector 26 is particularly desirable in the embodiment of the invention illustrated, since the chemical injector 26 receives at least one type of chemical agent that is to be added to the flow of water. Since thermoplastic is able to withstand the corrosive effects of the harsh chemical agents being injected, the thermoplastic material is particularly desirable for the chemical injector 26.

As described above, the supply manifold 20 is formed from either stainless steel or a high strength alloy to withstand the high pressure water inserted through the inlet fitting 32. The dissimilar materials used to construct the supply manifold 20 and the series of chemical injectors 26 allows for each component to be formed from the most desirable material while fitting together to operate as desired.

Although the preferred embodiment of the invention is shown as including multiple high pressure injector nozzles 42 positioned in a supply manifold 20, it is contemplated by the inventors that a single injector nozzle 46 could be used with one of the chemical injectors 26 in a simplified manner to provide a single source of high pressure water that includes a single injected chemical agent. In this contemplated embodiment, the injector nozzle 42 and the chemical injector 26 are still formed from dissimilar materials such that the injector nozzle 42 can withstand the high pressure water, while the chemical injector 26 is resistant to the corrosive effects of the chemical agent.

Referring back to FIGS. 3 and 4, each of the chemical injectors 26 includes an attachment end 66 that is received within a corresponding opening 68 formed within the outlet manifold 16. An O-ring 70 surrounds the attachment end 66 to provide a fluid tight fitting between the distribution manifold 16 and the attachment end 66 of the chemical injector 26. The outlet manifold 16, in turn, includes a series of outlet fittings 72 that allow for the distribution of the various water and chemical solutions to be applied to the vehicle being washed.

As illustrated in FIGS. 2 and 3, a series of bolts 74 pass through the distribution manifold 16 to secure the series of chemical injectors 26 between the supply manifold 20 and the distribution manifold 16. Each of the bolts 74 is received within a corresponding hole 76 formed within the supply manifold, as illustrated in FIG. 3.

As illustrated in FIGS. 3 and 4, a plug 78 can be placed in each of the flow control orifices 36 not being used by the chemical injection system of the present invention. The plug 78 prevents the high pressure water within the supply manifold 20 from exiting the supply manifold through the otherwise open orifice.

As can be understood in the Figures, the two-piece dissimilar construction of the high pressure injector nozzles 42 and the individual chemical injectors 26 allow the injector nozzles 42 and the individual injectors 26 to be replaced separately from each other. In each case, both the chemical injector 26 and the injector nozzle 42 can be removed and replaced from the supply manifold 20. In each case, the injector nozzle 42 is fit into the body 50 of the chemical inject 26. Further, the chemical injector 26 is press fit into the distribution manifold 16. Thus, each of the chemical injectors 26 can be easily replaced without replacing the entire distribution system.

As discussed previously, the injector nozzles 42 and the chemical injectors 26 are formed from different materials such that each of the components can be optimized depending upon its function. As discussed, the injector nozzles 42 are formed from stainless steel or brass to withstand the high pressure water entering through the inlet 22, while the chemical injectors 26 are formed from thermoplastic material to withstand the corrosive effect of the chemicals being distributed. In this manner, the chemical injection system can be configured to optimized the type of material being used.

Various alternatives and embodiments are contemplated as being within the scope of the following claims particularly pointing out and distinctly claiming the subject matter regarded as the invention.

We claim:

1. A chemical injection system for use in selectively supplying a plurality of chemicals into a supply of water, the chemical injection system comprising:

a supply manifold having an inlet for receiving a high pressure supply of water, the supply manifold including an internal passageway extending from the inlet and a plurality of flow control orifices in fluid communication with the internal passageway;

a plurality of high pressure injector nozzles each receivable in one of the flow control orifices of the supply manifold for selectively receiving the high pressure supply of water;

a plurality of chemical injectors each attachable to one of the injector nozzles, each chemical injector including a main passageway in fluid communication with the injector nozzle when the chemical injector is attached to the flow control orifice, the chemical injector including at least one chemical passageway for receiving a chemical and in communication with the main passageway for introducing the chemical into the main passageway;

wherein the injector nozzles and the chemical injectors are formed from dissimilar materials.

2. The chemical injection system of claim 1 wherein the injector nozzles are formed from stainless steel and the chemical injectors are each formed from thermoplastic.

3. The chemical injection system of claim 1 further comprising a plurality of valve controllers attachable to the supply manifold, the valve controllers being operable to control the flow of the high pressure supply water from the internal passageway of the supply manifold and one of the flow control orifices.

4. The chemical injection cleaning system of claim 1 wherein at least one of the chemical injectors includes a pair of chemical inlet passageways for receiving two distinct chemicals, each of the chemical inlet passageways being in fluid communication with the main passageway of the chemical injector.

5. The chemical injection system of claim 1 further comprising a distribution manifold coupled to the plurality of chemical injectors.

6. A chemical injection system for use in selectively supplying a plurality of chemicals into a supply of water used in a vehicle wash system, the chemical injection system comprising:

a supply manifold having an inlet for receiving a high pressure supply of water, the supply manifold including an internal passageway extending from the inlet and a plurality of flow control orifices in fluid communication with the internal passageway;

a plurality of injector nozzles each receivable in one of the flow control orifices, each injector nozzle including a fluid passageway in communication with the internal passageway of the supply manifold when the injector nozzle is received within the flow control orifice; and a plurality of chemical injectors each attachable to one of the injector nozzles, each chemical injector including a main passageway in fluid communication with the fluid passageway of the injector nozzle when the chemical injector is attached to the injector nozzle, the chemical injector including at least one chemical passageway for receiving a chemical and in communication with the main passageway for introducing the chemical into the main passageway;

wherein the injector nozzles and the chemical injectors are formed from dissimilar materials.

7. The chemical injection system of claim 6 wherein the injector nozzles are formed from a metallic material and the chemical injectors are each formed from thermoplastic.

8. The chemical injection system of claim 6 further comprising a plurality of valve controllers attachable to the supply manifold, the valve controllers being operable to control the flow of the high pressure supply water from the internal passageway of the supply manifold and one of the flow control orifices.

9. The chemical injection system of claim 6 further comprising an O-ring surrounding the injector nozzle to provide a seal between the injector nozzle and one of the chemical injectors.

10. The chemical injection cleaning system of claim 6 wherein at least one of the chemical injectors includes a pair of chemical inlet passageways for receiving two distinct chemicals, each of the chemical inlet passageways being in fluid communication with the main passageway of the chemical injector.

11. The chemical injection system of claim 6 further comprising a distribution manifold coupled to the plurality of chemical injectors.

12. A chemical injection system for use in selectively supplying a plurality of chemicals into a supply of water used in a vehicle wash system, the chemical injection system comprising:

a supply manifold having an inlet for receiving a high pressure supply of water, the supply manifold including an internal passageway extending from the inlet and a plurality of flow control orifices in fluid communication with the internal passageway;

a plurality of injector nozzles each receivable in one of the flow control orifices, each injector nozzle including a fluid passageway in communication with the internal passageway of the supply manifold when the injector nozzle is received within the flow control orifice; and at least one single chemical injector positionable on one of the injector nozzles, the single chemical injector including a main passageway in fluid communication with the fluid passageway of the injector nozzle, the single chemical injector including a chemical inlet passageway for receiving a chemical and in communication with the main passageway for introducing the chemical into the main passageway;

at least one dual chemical injector positionable on one of the injector nozzles, the dual chemical injector including a main passageway in fluid communication with the fluid passageway of the injector nozzle, the dual chemical injector including a first chemical inlet passageway for receiving a first chemical and in fluid communication with the main passageway for introducing the first chemical into the main passageway and a second chemical inlet passageway for receiving a second chemical and in communication with the main passageway for introducing the second chemical into the main passageway;

wherein the injector nozzles are formed from a metallic material and the single chemical injector and the dual chemical injector are formed from thermoplastic.

13. A chemical injection system for use in supplying at least one chemical into a supply of water, the chemical injection system comprising:

a high pressure injector nozzle coupled to a high pressure supply of water, the injector nozzle including a fluid passageway permitting the flow of high pressure water through the injector nozzle and out of an outer end of the injector nozzle; and a chemical injector attachable to the injector nozzle, the chemical injector including a main passageway in fluid communication with the fluid passageway of the injector nozzle to receive the flow of high pressure water from the outer end of the injector nozzle, the chemical injector including a chemical inlet passageway for receiving a chemical and in communication with the main passageway for introducing the chemical into the main passageway;

wherein the injector nozzle is formed from a metallic material and the chemical injector is formed from a thermoplastic material.

14. The chemical injection system of claim 13 further comprising a valve controller operable to control the flow of the high pressure supply water into the injector nozzle.

* * * * *